United States Patent
Hugo et al.

(10) Patent No.: US 6,740,230 B1
(45) Date of Patent: May 25, 2004

(54) METHOD FOR REMOVING MERCAPTANS FROM FLUID FLUXES

(75) Inventors: Randolf Hugo, Dirmstein (DE); Rupert Wagner, Worms (DE); Thomas S. Holst, Calgary (CA); Christoph Grossmann, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 29 days.

(21) Appl. No.: 10/019,313

(22) PCT Filed: Jul. 14, 2000

(86) PCT No.: PCT/EP00/06749

§ 371 (c)(1),
(2), (4) Date: Jan. 9, 2002

(87) PCT Pub. No.: WO01/05488

PCT Pub. Date: Jan. 25, 2001

(30) Foreign Application Priority Data

Jul. 15, 1999 (DE) .......................... 199 33 301

(51) Int. Cl.⁷ .......................... C01B 17/00; C10G 29/20; C10G 29/22
(52) U.S. Cl. .......................... 208/237; 423/228; 423/229; 423/242.6; 423/242.7
(58) Field of Search .............................. 423/228, 229, 423/242.1, 242.7, 226, 220, 242.6; 208/237

(56) References Cited

U.S. PATENT DOCUMENTS

| | | | |
|---|---|---|---|
| 3,622,267 A | 11/1971 | Bartholome et al. | 23/2 R |
| 4,336,233 A | 6/1982 | Appl et al. | 423/228 |

(List continued on next page.)

FOREIGN PATENT DOCUMENTS

| | | |
|---|---|---|
| CA | 1291321 | 10/1991 |
| CA | 1295810 | 2/1992 |
| DE | 1 542 415 | 4/1970 |
| DE | 1 904 428 | 8/1970 |
| DE | 37 17 556 A1 | 12/1987 |
| GB | 1058304 | 2/1967 |
| GB | 2 191 419 A | 12/1987 |
| WO | 00/00271 | 1/2000 |

OTHER PUBLICATIONS

Chemical Abstracts of EP 0 322 924, Jul. 5, 1989.
A. L. Kohl, et al., 5$^{th}$ Edition, pps. 155–156, "Gas Purification", 1997.
Campbell Petroleum Series, 4$^{th}$ Edition, vol. 4, p. 51, "Gas Conditioning and Processing, Gas Treating and Liquid Sweetening", Jan. 1998.

Primary Examiner—Wayne A. Langel
(74) Attorney, Agent, or Firm—Oblon, Spivak, McClelland, Maier & Neustadt, P.C.

(57) ABSTRACT

The disclosure concerns a process for removing mercaptans from fluid streams comprising same, especially from hydrocarbon gas streams, for example natural gas, synthesis gas from heavy oil or heavy residues or refinery gas, or else from liquid hydrocarbons, for example LPG (liquefied petroleum gas). The invention comprises intimately contacting the fluid stream in an absorption or extraction zone with a scrubbing liquor comprising at least one aliphatic alkanolamine of 2–12 carbon atoms, the amount of wash liquor being supplied to the absorption or extraction zone being sufficient to remove at least $CO_2$ and $H_2S$ essentially completely from the fluid stream, and separating the substantially decontaminated fluid stream and the contaminated wash liquor and discharging them from the absorption zone. The substantially complete removal of $CO_2$ and $H_2S$ is accompanied by the removal from the gas, stream of a very large portion of the mercaptans as well, without a significant fraction of the hydrocarbon gases dissolving in the wash liquor.

20 Claims, 1 Drawing Sheet

U.S. PATENT DOCUMENTS

Figure 1:
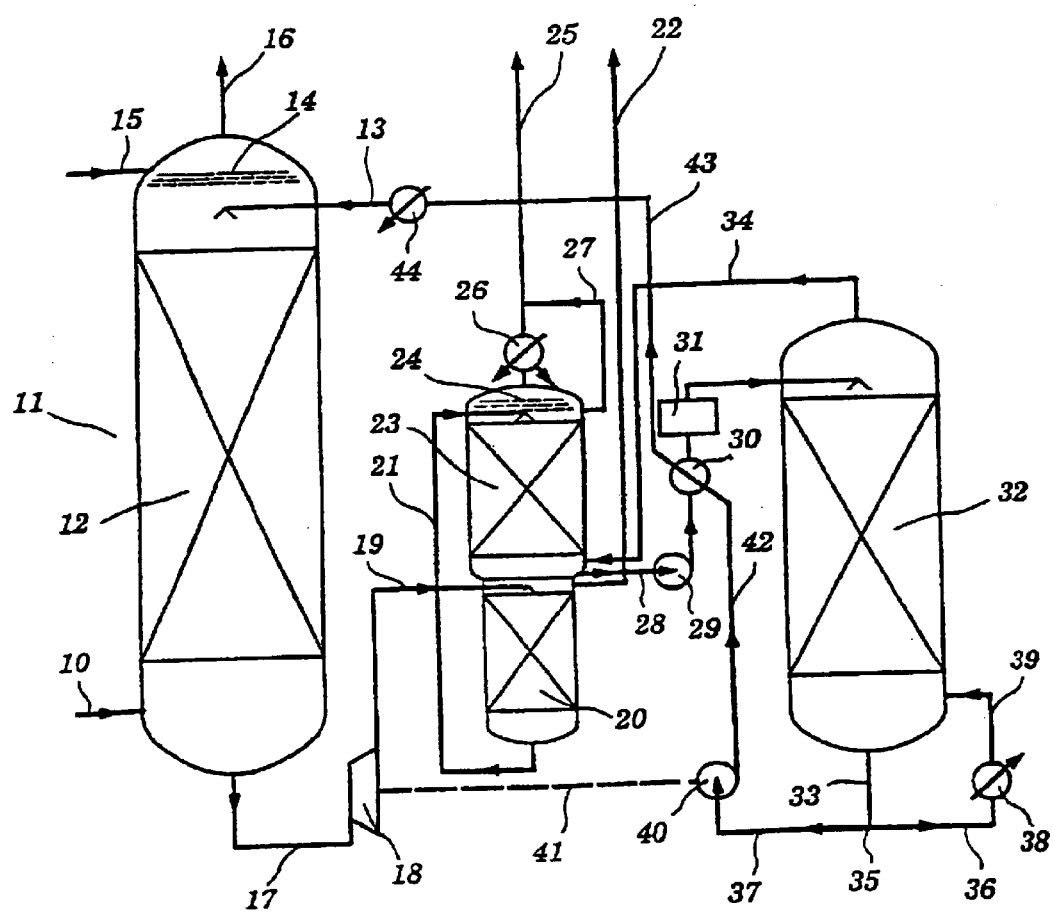

| | | | |
|---|---|---|---|
| 4,462,968 A | 7/1984 | Tazuma et al. | 423/224 |
| 4,484,934 A | 11/1984 | Ferrin et al. | 55/32 |
| 4,537,753 A | 8/1985 | Wagner et al. | 423/228 |
| 4,551,158 A | 11/1985 | Wagner et al. | 55/46 |
| 4,553,984 A | 11/1985 | Volkamer et al. | 55/46 |
| 4,808,765 A | 2/1989 | Pearce et al. | 585/860 |
| 4,840,777 A | 6/1989 | Faucher | 423/229 |
| 4,853,012 A | 8/1989 | Batteux et al. | 55/44 |
| 4,999,031 A | 3/1991 | Gerhardt et al. | 55/43 |
| 5,462,721 A | 10/1995 | Pounds et al. | 423/226 |
| 5,589,149 A * | 12/1996 | Garland | 423/242.4 |
| 5,705,090 A | 1/1998 | Garland et al. | 252/184 |
| 6,277,345 B1 * | 8/2001 | Stankowiak et al. | 423/210 |
| 6,337,059 B1 * | 1/2002 | Schubert et al. | 423/210 |

* cited by examiner

METHOD FOR REMOVING MERCAPTANS FROM FLUID FLUXES

The present invention relates to a process for removing mercaptans from fluid streams comprising same, especially from hydrocarbon gas streams, for example, natural gas, synthesis gas from heavy oil or heavy residues or refinery gas, or else from liquid hydrocarbons, for example LPG (liquefied petroleum gas).

Numerous processes in the chemical industry give rise to fluid streams comprising acid gases, for example $CO_2$, $H_2S$, $SO_2$, $CS_2$, HCN, COS or mercaptans as impurities.

The LPG or gas streams in question here can be for example hydrocarbon gases from a natural gas source, synthesis gases from chemical processes or, say, reaction gases involved in the partial oxidation of organic materials, for example coal or petroleum. The removal of sulfur compounds from these fluid streams is of particular importance for various reasons. For instance, the level of sulfur compounds in natural gas has to be reduced by suitable processing measures immediately at a natural gas well, since the natural gas will normally also contain a certain fraction of entrained water as well as the above-recited sulfur compounds. In aqueous solution, however, these sulfur compounds form acids and have a corrosive effect. To transport natural gas in a pipeline, therefore, predetermined limits must be complied with for the sulfur-containing impurities. In addition, numerous sulfur compounds are malodorous and—with hydrogen sulfide ($H_2S$) a prime example—extremely toxic even at low concentrations.

Similarly, the $CO_2$ content of hydrocarbon gases, such as natural gas, customarily has to be significantly reduced, since high concentrations of $CO_2$ reduce the calorific value of the gas and may likewise cause corrosion to pipework and fittings.

There are therefore numerous processes already in existence for removing acid gas constituents from fluid streams such as hydrocarbon gases or LPG. In the most widely used processes, the fluid mixture containing acid gases is contacted with an organic solvent or an aqueous: solution of an organic solvent as part of a gas scrub process.

There is extensive patent literature on gas scrub processes and the scrubbing solutions used in these processes. In principle, two different kinds of gas scrub solvents can be distinguished:

On the one hand there are physical solvents, which rely on a physical absorption process, i.e., the acid gases dissolve in the physical solvent. Typical physical solvents are cyclotetramethylene sulfone (sulfolane) and its derivatives, aliphatic acid amides, NMP (N-methylpyrrolidone), N-alkylated pyrrolidones and corresponding piperidones, methanol and mixtures of dialkylethers of polyethylene glycols (Selexol®, Union Carbide, Danbury, Conn., USA).

On the other hand, there are chemical solvents which work on the basis of chemical reactions which convert the acid gases into compounds which are simpler to remove. For instance, the most widely used chemical solvents in industry, aqueous solutions of alkanolamines, form salts when acid gases are passed through, and these salts can either be decomposed by heating and/or stripped off by means of steam. The alkanolamine solution is regenerated in the course of the heating or stripping, so that it can be re-used. Preferred alkanolamines used for removing acid gas impurities from hydrocarbon gas streams include monoethanolamine (MEA), diethanolamine (DEA), triethanolamine (TEA), diisopropylamine (DIPA), diglycolamine (DGA) and methyldiethanolamine (MDEA).

Primary and secondary alkanolamines are particularly suitable for gas scrubs where the purified gas has to have a very low $CO_2$ content (e.g., 10 $ppm_v$ of $CO_2$). To remove $H_2S$ from gas mixtures having a high original $CO_2$ content, however, it has been found to be disadvantageous that the effectiveness of the solution for removing $H_2S$ is much reduced by an accelerated absorption of $CO_2$. In addition, the regeneration of solutions of primary and secondary alkanolamines consumes large volumes of steam.

The European patent application EP-A-0 322 924 discloses, for example, that tertiary alkanolamines, especially MDEA, are particularly suitable for a selective removal of $H_2S$ from gas mixtures containing $H_2S$ and $CO_2$.

The German patent application DE-A-1 542 415 proposes increasing the effectiveness not only of physical solvents but also of chemical solvents by addition of monoalkylalkanolamines or of morpholine and its derivatives. The German patent application DE-A-1 904 428 describes the addition of monomethylethanolamine (MMEA) as an accelerant to improve the absorption properties of an MDEA solution.

U.S. Pat. No. 4,336,233 describes one of the currently most effective scrubbing solutions for removing $CO_2$ and $H_2S$ from a gas stream. It is an aqueous solution of about 1.5 to 4.5 mol/l of methyldiethanolamine (MDEA) and 0.05 to 0.8 mol/l of piperazine as absorption accelerant (αMDEA®, BASF AG, Ludwigshafen). The removal of $CO_2$ and $H_2S$ using MDEA is further described in greater detail in the following patents of present assignee: U.S. Pat. Nos. 4,551, 158; 4,553,984; 4,537,753; 4,999,031, CA 1 291 321 and CA 1 295 810. The removal of mercaptans from gas streams containing same is not mentioned in these property rights.

Mercaptans are substituted forms of $H_2S$ in which a hydrocarbyl R takes the place of one of the hydrogen atoms. Their general formula is therefore RSH. The properties of mercaptans depend substantially on the length of the hydrocarbon chain. Mercaptans in aqueous solution likewise act as acids, but are significantly weaker than $H_2S$, for example. With increasing length of the hydrocarbon chain, therefore, mercaptans behave like hydrocarbons, which makes their removal from hydrocarbon gas streams particularly difficult. For instance, there is a report in the literature that MEA and DEA solutions will remove about 45 to 50% of methyl mercaptan, but only 20 to 25% of ethyl mercaptan and about 0 to 10% of propyl mercaptan (A. Kohl, R. Nielsen: "Gas Purification", $5^{th}$ Edition, 1997, p.155). "Gas Conditioning and Processing", Vol. 4: "Gas Treating and Liquid Sweeting", $4^{th}$ Ed., J. M. Campbell & Company, 1998, states on page 51 that aqueous amine solutions have little if any utility with regard to the removal of mercaptans from gas streams. Mercaptans occur in some natural gas sources, especially on the North American continent, and are typically present in most liquid or liquefied refined hydrocarbon products (LPG). However, because of their corrosive and malodorous properties, mercaptans must likewise be substantially removed from hydrocarbon gases or liquids. Treated and purified hydrocarbons for polymerization reactions, for example, should customarily contain not more than 1–20 ppm of mercaptans.

The literature contains a wide variety of proposals for removing mercaptans from fluid streams containing same:

U.S. Pat. No. 4,808,765 describes a three-stage process for removing acid gases from a gaseous hydrocarbon stream. The first step is an absorption process in which an aqueous solvent which contains MDEA as a selective absorbent for $H_2S$ and DIPA as a selective absorbent for COS, to remove substantially all the $H_2S$ and a portion of the COS. The second step, which utilizes an aqueous alkaline solution of a primary alkanolamine as scrubbing solution, removes a substantial portion of the remaining COS. The third step, finally, removes mercaptans with the aid of an aqueous caustic solution (NaOH). This process is very complicated in terms of apparatus, since the individual scrubbing solutions have to be regenerated separately. Moreover, the hydrocarbon gas stream has to be subsequently additionally scrubbed with water to remove remnants of the caustic solution.

U.S. Pat. No. 4,462,968 states that, although traditional alkanolamine solutions are capable of removing $H_2S$ down to concentrations of less than 4 ppm, these processes are not suitable for removing mercaptans. U.S. Pat. No. 4,462,968 therefore proposes a scrubbing solution for the removal of mercaptans which consists of hydrogen peroxide or a combination of hydrogen peroxide with ammonia or with an amine. However, this process can be operated as a one-step process only with regard to gas streams having a sulfur content of not more than 50 ppm. At a higher sulfur content, it is necessary to operate a two-step process in which the first step involves using an alkanolamine scrubbing solution to remove $H_2S$ and the second step employs a hydrogen peroxide scrubbing solution to remove mercaptans, sulfides and disulfides.

U.S. Pat. No. 4,484,934 describes neat methoxyethylpyrrolidone as a physical solvent for removing mercaptans and other sulfur compounds from a gas stream. It further describes a solvent consisting of water, amine and methoxyethylpyrrolidone.

Lastly, the international patent application WO 95/13128 describes a process and a solvent for absorbing mercaptans from gas streams, the scrubbing solution comprising a polyalkylene glycol alkyl ether, for example methoxytriglycol, a secondary monoalkanolamine and optionally further amines, such as MDEA or DEA.

However, the use of a physical solvent such as methoxytriglycol for removing mercaptans from gas streams is associated with disadvantages. Physical solvents are typically used in excess, so that not only mercaptans but also a large fraction of product of value, i.e., hydrocarbon gases in the case of natural gas, are absorbed in the solvent. The increasing absorption of hydrocarbons with increasing pressure is disadvantageous in a high pressure natural gas scrub in particular. This is because the absorbed product of value is then either burned as flash gas and accordingly lost or recycled into the absorber feed, which, because of the recompression required and on account of the increase in the internal stream, leads to an increase in the size of the plant and to higher operating costs.

It is an object of the present invention to provide a simple and economical process for reliably removing mercaptans as well as other acid gas constituents from gaseous or liquid hydrocarbon streams.

We have found that this object is achieved by the process of the present claim 1. The invention accordingly provides a process for removing mercaptans from a fluid stream comprising mercaptans and further acid gases, especially $CO_2$ and/or $H_2S$, which comprises intimately contacting the fluid stream in an absorption or extraction zone with a scrubbing liquor comprising at least one aliphatic alkanolamine of 2–12 carbon atoms, the amount of scrubbing liquor being supplied to the absorption or extraction zone being sufficient to remove at least $CO_2$ and $H_2S$ essentially completely from the fluid stream. The intimate contact between fluid stream and scrubbing liquor in the absorption zone ensures that mercaptans and other acid gases are absorbed by the scrubbing liquor. The substantially decontaminated lean fluid stream and the loaden scrubbing liquor are then separated and discharged from the absorption or extraction zone. The loaden scrubbing liquor contaminated with mercaptans and other acid gas constituents and discharged from the absorption zone is then customarily regenerated. The regenerated lean scrubbing liquor can then be recycled back into the absorption zone.

The fluid stream of the process of the invention can be a gaseous or liquid hydrocarbon stream. Natural gas is a typical example of a gas stream, while LPG is an example of a liquid stream.

In the process of the invention, the scrubbing liquor is preferably an aqueous solution and contains from 10 to 70% by weight of the aliphatic alkanolamine with particular advantage. Any reference in the present context to an aliphatic alkanolamine is also to be understood as encompassing a mixture of different alkanolamines, in which case the above-stated percentages then relate to the total alkanolamine content.

The process of the invention is distinguished from existing processes for removing mercaptans from fluid streams in that the scrubbing liquor used contains only a small fraction, preferably not more than 5% by weight, of a physical solvent for mercaptans. It is particularly preferable for the scrubbing liquor not to contain any of the customary physical solvents for mercaptans. While mercaptans and other acid gases possess a certain solubility even in water and in alkanolamines, these are not deemed to be physical solvents in the proper sense. On the contrary, physical solvents for the purposes of the present invention are in particular those typical physical solvents used in gas scrubbing, such as cyclotetramethylene sulfone (sulfolane), aliphatic acid amides, NMP, N-alkylated pyrrolidones, methanol or alkyl or dialkyl ethers of polyethylene glycol. Such solvents are preferably not employed in the scrubbing liquor of the invention, since the excess operation envisaged according to the invention would lead to a high loss of the product of value, the hydrocarbon gas.

Aqueous alkanolamine solutions have hitherto merely been used for removing $H_2S$ and $CO_2$. The process of the invention surprisingly makes it possible to use these scrubbing liquors, which are known per se, to remove mercaptans from fluid streams, too. The aspect which must be a particular surprise to those skilled in the art is the observation underlying the invention that it is sufficient to dimension an absorption column in such a way that any $CO_2$ present in the feed gas and any $H_2S$ present in the feed gas are essentially completely removed from the fluid stream. The amount of scrubbing liquor this requires then automatically leads to a substantial removal of mercaptans from the fluid stream. For example, the process of the invention provides a reduction in the mercaptan content of natural gas by from 75% to 95%, which is simply considered impossible in the literature for an amine scrub, i.e., a scrub with an aqueous amine solution as scrubbing liquor.

The removal of $CO_2$ and $H_2S$ from a hydrocarbon fluid stream is familiar to those skilled in the art. There is already commercial software available which, on the basis of predetermined plant parameters and the specifications desired for the purified gas or LPG, can calculate the operating parameters for a certain scrubbing liquor (an example is the TSWEET program from Brian Research & Engineering). The invention proposes dimensioning the operating parameters in such a way that the $CO_2$ and $H_2S$ levels in a given fluid stream are lowered for example to not more than 500 ppm, preferably 50 ppm Of $CO_2$ and not more than 10 ppm, preferably 4 ppm of $H_2S$, respectively. The required amount of scrubbing liquor which can be calculated on that basis will according to the invention also remove a very large portion of the mercaptans present in the fluid stream.

The process of the invention provides for substantial removal of mercaptans from the fluid stream while at the same time only relatively small amounts of gaseous or (in the case of LPG) liquid hydrocarbons are dissolved in the scrubbing liquor. There is thus hardly any loss of product of value, and the disadvantages of the physical solvents traditionally used for mercaptan removal are avoided. Typically, the scrubbing liquor discharged from the absorption region contains less than 1% by weight of hydrocarbons, preferably less than 0.3% by weight of hydrocarbons, particularly preferably less than 0.1% by weight of hydrocarbons.

The inventors determined that effective, i.e., substantial, mercaptan removal (i.e. essentially methyl mercaptan, ethyl mercaptan and propyl mercaptan) requires the removal of all major acid gas components (for example, in the case of a natural gas stream, mainly $CO_2$, $H_2S$, COS). It is not possible to substantially remove mercaptans while, for example, $CO_2$ or $H_2S$ are only removed incompletely and are still present in the treated gas in the percent range, say. The absorption of the individual components takes place roughly in the order of the acid strength, i.e., essentially in the order of $H_2S$, $CO_2$, COS, mercaptans. Since the mercaptans, as very weak acids, are absorbed by the scrubbing liquor as the last component, as it were, the invention proposes offering an excess of scrubbing liquor in order that the mercaptans may be absorbed as well as $H_2S$, $CO_2$ and COS. The inventors determined that an insufficient amount of solvent leads to a displacement of the mercaptans by the stronger acids, with the result that only little mercaptan is absorbed. Typical values as chosen according to the invention for natural gas scrubbing, for example, are frequently within the range from 10 to 50 liters of scrubbing liquor per cubic meter (s.t.p.) of acid gas in the gas stream ($m^3$ s.t.p.=$m^3$ at 0° C. and 101.325 kPa (1.01325 bar absolute)). However, it is impossible to define the excess precisely, since the absorption of acid gas constituents in the scrubbing liquor proposed by the invention is not precisely stoichiometric. More particularly, the optimum ratio of scrubbing liquor to the acid gas fraction in the feed gas or feed LPG will depend on the equilibrium conditions which in turn depend on the respective operating parameters, in the case of a gas scrub in particular on the feed gas temperature and the feed gas pressure, the feed gas composition, the temperature of the (regenerated) scrubbing liquor, the residual contamination of the scrubbing liquor, the absorber base-of-column temperature, the separating efficiency of the column (number of plates or height equivalent to a theoretical plate), etc., although the absorber base-of-column temperature is usually not a free parameter, but is determined by the heat of absorption. On the basis of the fundamentals described, a person skilled in the art is able to compute the requisite excess of scrubbing liquor for the particular operating conditions using, for example, the abovementioned TSWEET program and optimize the operating conditions in actual service, starting from the computed values, by means of a few series of experiments.

It is true that there are at present no commercial programs for mercaptan removal using an amine scrub, since amine scrubs were hitherto considered unsuitable for this purpose. With the process proposed by the invention, however, mercaptan removal can be based on the removal of the acid gases $CO_2$ and $H_2S$ which are traditionally removable using an amine scrub. For example, using the TSWEET program, it is possible to compute a scrubbing liquor quantity to provide for 95% removal of $CO_2$ and $H_2S$. The invention then provides that this theoretically determined solvent quantity, be raised by from 5 to 30%, preferably by from 10 to 20%. This excess, then, would then also provide for the removal of a very large portion of the mercaptans present in the fluid stream.

The aliphatic alkanolamine used is preferably a tertiary alkanolamine, for example triethanolamine (TEA) or methyldiethanolamine (MDEA), the use of MDEA being particularly preferred for gas streams.

The scrubbing liquor advantageously further contains from 0 to 20% by weight of a primary or secondary amine as activator, especially of a primary or secondary alkanolamine or of a saturated 5- or 6-membered N-heterocycle which optionally contains further heteroatoms selected from O and N. The activator is advantageously selected from the group consisting of monoethanolamine, monomethylethanolamine, diethanolamine, piperazine, methylpiperazine and morpholine. The preferred activator used in the process of the invention is piperazine in a concentration of from 0.5 to 15% by weight, particularly preferably from 3 to 8% by weight.

The process of the invention can be carried out with the customary scrubbing means used in gas scrubbing or LPG scrubbing. Suitable scrubbing means, which ensure an intimate contact between the fluid stream and the scrubbing liquor, are for example randomly packed, structurally packed and plate columns, radial flow scrubbers, jet scrubbers, venturi scrubbers and rotational spray scrubbers, preferably structurally packed, randomly packed and plate columns.

The temperature of the scrubbing liquor in the absorption column is typically within the range from 40 to 70° C. at the top of the column and from 50 to 100° C. at the base of the column. The overall pressure in the column is generally within the range from 1 to 120 bar, preferably within the range from 10 to 100 bar.

The process of the invention can be carried out in one step or in a plurality of successive substeps. In the latter case, the fluid stream containing the acidic gas constituents is intimately contacted in each substep with a separate substream of the scrubbing liquor. For example, various locations in the absorption zone can be supplied with a substream in the absorbent, in which case—if an absorption column is used, for example—the temperature of the supplied scrubbing liquor in successive substeps generally decreases from the base to the top of the column.

The scrubbing liquor contaminated with acidic gas constituents can be regenerated and subsequently returned into the absorption zone with reduced contamination. Typically, in the course of the regeneration, the contaminated scrubbing liquor is decompressed from a relatively high pressure, prevailing in the absorption zone, to a lower pressure. Decompression can be accomplished by means of a throttle valve, for example. Additionally or alternatively, the scrubbing liquor can be passed through an expansion turbine with which a generator may be driven and electric energy may be obtained. The energy thus removed from the scrubbing liquor in the course of expansion can be also used, for example, to drive liquid pumps in the scrubbing liquor recirculation system.

The removal of the acidic gas constituents to regenerate the scrubbing liquor can be effected, for example, in an expansion column, for example a vertical or horizontal flash vessel or a countercurrent column fitted with internals. There may be a plurality of consecutive expansion columns in which regeneration is effected at different pressures. For example, the scrubbing liquid can be initially regenerated in a pre-expansion column at high pressure, for example at about 1.5 bar above the partial pressure of the acidic gas constituents in the absorption zone, and then in a main expansion column at low pressure, for example at from 1 to 2 bar absolute. If a multistage expansion process is used, the first expansion column preferably removes inert gases, such as absorbed hydrocarbons, and the subsequent expansion columns, the acidic gas constituents.

Preferably, the scrubbing liquor to be regenerated is also subjected to a stripping process to remove further acid gases. To this end, the scrubbing liquor and a stripping agent, advantageously a hot gas (steam is preferred), is passed countercurrently through a desorption column equipped with random packings, structured packings or plates. Preferably, the stripping pressure is from 1 to 3 bar absolute at a temperature from 90 to 130° C.

A regeneration of the scrubbing liquor in a plurality of successive substeps in which the contamination of the scrubbing liquor with acid gas constituents decreases with every substep is described in, for example, U.S. Pat. No. 4,336,233, where a coarse scrub is carried out with an expansion cycle only and no stripping, and the contaminated scrubbing liquor is decompressed through an expansion turbine and regenerated stepwise in a pre-expansion column and a main expansion column. This variant is used in particular when the acidic gases to be scrubbed out have high partial pressures and when the clean gas has to meet only low purity requirements.

In a further preferred embodiment of the process of the present invention, the scrubbing liquor substreams used in successive substeps of the scrubbing or absorption process are obtainable through successive substeps of the regeneration process and have a decreasing contamination with acidic gas constituents. In a particularly preferred process, the feed gas or LPG containing the acidic constituents are intimately contacted in succession with a first substream of the scrubbing liquor (obtained after partial regeneration in an expansion column and prior to stripping) and a second substream of the scrubbing liquor (obtained after stripping).

For example, as described in U.S. Pat. No. 4,336,233, the absorption step can be carried out in two substeps, a coarse scrub and a fine scrub, and the regeneration step stepwise through decompression in an expansion turbine, a pre-expansion column and a main expansion column, and also through subsequent stripping. In this case, the substream of the scrubbing liquor for the coarse scrub can come from the main expansion column and the substream for the fine scrub from the stripping stage.

The regenerated absorbent, before it is introduced into the absorption zone, is customarily passed through a heat exchanger to adjust it to the temperature required for the scrub. For example, the regenerated scrubbing liquor leaving the stripping column can have heat removed from it and supplied to the scrubbing liquor still containing acid gas constituents prior to its entry into the stripping column.

The process of the invention can be carried out using typical plant configurations used for gas scrubbing and subsequent regeneration of the scrubbing liquor, as described for example in U.S. Pat. No. 4,336,233 for a one-stage or two-stage scrubbing process and particularly extensively in EP-A 0 322 924 for a single-stage scrubbing process featuring an expansion and stripping step. The two documents are hereby expressly incorporated herein by, reference.

The invention further proposes that conventional activated aqueous methyldiethanolamine solutions, hitherto merely used for removing $CO_2$ and $H_2S$ from gas streams, also be used for removing mercaptans from fluid streams containing same. The present invention accordingly also provides for the use of an activated aqueous MDEA solution for removing mercaptans from fluid streams containing same, especially from hydrocarbon gases such as natural gas or from LPG. Such scrubbing liquors are being marketed as highly concentrated solutions, for example under the brand name of a MDEA® (manufacturer: BASF AG, Ludwigshafen, Germany) with piperazine as activator. The user dilutes the highly concentrated solution with water until the solution has approximately the following composition: from 10 to 70% by weight of methyldiethanolamine, from 0.5 to 15% by weight of piperazine and from 30 to 60% by weight of water.

The process of the invention will now be more particularly described with reference to the accompanying drawing. The FIGURE of the drawing illustrates a use example of the process of the invention in a single-stage scrubbing process followed by a regeneration of the scrubbing liquor using expansion and stripping columns.

Referring to the FIGURE, a preferred arrangement can be seen for carrying out the process of the invention, as used for example for removing mercaptans from a natural gas stream containing mercaptans and further acid gases.

The fluid mixture, which may for example contain natural gas as product of value and in addition acid gases such as $H_2S$, $CO_2$ and mercaptans, is passed through a feed line 10 into an absorption column 11. Upstream of the point of entry into the absorption column there may be provided separating means (not depicted), for example to remove droplets of liquid from the crude gas. The absorption column 11 possesses an absorption zone 12 which ensures intimate contact between the acidic crude gas and a scrubbing liquor which is lean with regard to acid gases and which passes into the head region of the absorption column 11 via feed line 13 and is passed countercurrently to the gas to be treated. The absorption region 12 can be realized for example in the form of plates, for example sieve or bubble cap plates, or through packing. Typically, the number of plates used is from 20 to 34. In the head region of the absorption column 11 there may be disposed from 1 to 5 backwash plates 14 so as to reduce the loss of volatile constituents of the scrubbing liquor. The backwash plates 14, constructed as bubble cap plates, for example, are fed via condensate line 15 with water through which the treated gas is passed.

The natural gas stream substantially freed of acid gas constituents including the mercaptans leaves the absorption column 11 via a head takeoff 16. The line 16, especially if no backwash plates are provided in the column 11, may be equipped on the inside with a separator (not depicted) to remove entrained scrubbing liquor from the gas stream.

Instead of the single-stage absorption facility described herein, it is also possible to use a two-stage variant as depicted for example in FIG. 2 of U.S. Pat. No. 4,336,233.

The scrubbing liquor containing acid gas leaves the absorption column 11 via line 17 and passes through an optional expansion turbine 18 and a line 19 into the head region of a first expansion column 20. In the expansion column 20, the scrubbing liquor pressure is suddenly decreased, so that the lighter hydrocarbons are able to evaporate from the scrubbing liquor. These hydrocarbons can be incinerated or returned into absorption column 11. However, the process of the invention is notable for the fact that the fraction of absorbed hydrocarbons in the scrubbing liquor leaving the absorption column 11 is very low— despite the excess supply of scrubbing liquor. It is therefore usually possible to dispense with complicated recycling of the hydrocarbons from the expansion column 20 into the absorption column 11. The scrubbing liquor leaves the first expansion column 20 via line 21 at the base of the column, whereas the evaporated hydrocarbons are withdrawn via line 21 at the top of the expansion column 20.

In the depicted example, the scrubbing liquor then passes into a second expansion column 23, which can be configured as a low pressure flash column, for example. Less volatile acid gases evaporate off via the line 25, having passed through optional backwash plates 24. At the top of the second expansion column 23 there can be provided a heat exchanger with head distributor or condenser 26 to return entrained droplets of the scrubbing liquor into the expansion column. The condenser 26 can optionally be bypassed by a bypass line 27. The scrubbing liquor leaves the second expansion column 23 via line 28 and is pumped via pump 29 through a heat exchanger 30, where it takes up heat from the regenerated scrubbing liquor returned to the absorption column 11. The line 28 can be equipped on the inside with an intermediate vessel 31 in which the COS is hydrolyzed, if desired. The scrubbing liquor then passes into the head region of a stripping column 32 in which the scrubbing liquor passes countercurrently to a gas stream, for example steam. The stripping column 32 removes remaining acid gas constituents from the scrubbing liquor. The scrubbing liquor leaves the base region of the stripping column 32 via line 33, while the stripped-off acid gas constituents return via line 34 into the base region of the second expansion column 23. The scrubbing liquor leaving through the line 33 passes to a distributor 35 where a portion of the scrubbing liquor is transported via line 36 to a reboiler 38, which heats the liquid and returns it as vapor via line 39 into the stripping tube. Another portion of the scrubbing liquor passes from the distributor 35 via line 37 to a pump 40, which, as shown schematically in the form of the transfer path 41, is connected to the expansion turbine 18. The expansion turbine supplies a portion of the energy required to drive the pump 40. The regenerated scrubbing liquor, which is lean in acid gases, passes via line 42 into the heat exchanger 30, where it transfers heat to the scrubbing liquor passing via line 28 into the stripping column 32. The regenerated scrubbing liquor then passes through the lines 43 and 13 back into the absorption column 11 to again absorb acid gases. Upstream of the point of entry into the absorption column there can be provided a further heat exchanger 44 to cool the scrubbing liquor to the requisite feed temperature. Similarly, filters and other cleaning means not depicted can be provided so as to clean the scrubbing liquor prior to its entry into the absorption column 11.

The region of the lines 43, 13 may additionally be equipped with (not depicted) feed lines for fresh scrubbing liquor in the event that the required inflow rate cannot be maintained with a regenerated scrubbing liquor alone.

The amount of inflowing scrubbing liquor can be controlled by means of the pumps and by means of (not depicted) valve and throttle means.

The Examples which follow illustrate the invention.

EXAMPLES

Example 1

Pilot Plant for Cleaning Natural Gas

A pilot plant for cleaning natural gas, consisting of an absorption column and a stripping column for regenerating the scrubbing liquor, was charged with 200 m³/h (s.t.p.) of natural gas as feed gas. At a pressure of 6 MPa (60 bar abs.) and a temperature of 40° C., the feed gas contained the following acidic constituents: 9.52%(v/v) of $H_2S$, 2.99%(v/v) of $CO_2$ and 144 $ppm_v$ of $CH_3SH$. The absorption region of the column was formed by a randomly dumped bed of 25 mm packing elements (IMTP 25, from Norton) 9 m in depth. The absorber top of column temperature (i.e., the temperature of the regenerated scrubbing liquor passed in) was 40° C.

The gas was treated with 0.875 m³/h of a scrubbing solution which had the following composition: 38.1% by weight of MDEA, 35% by weight of piperazine and 58.4% by weight of water. A virtually completely regenerated scrubbing liquor was used. The residual contamination of the scrubbing liquor was less than 2 m³ of acid gases per 1000 kg of scrubbing liquor.

The clean gas withdrawn at the top of the absorption column contained 0% of $CO_2$, 5.3 $ppm_v$ of $H_2S$, 26 $ppm_v$ of $CH_3SH$. Thus, 84.2% of the $CH_3SH$ in the feed gas were removed.

Example 2

Commercial Plant for Cleaning Natural Gas

A commercial plant for cleaning natural gas, consisting of a 20 plate absorption column, a flash column and a stripping column, was charged with 53,625 m³/h (s.t.p.) of natural gas as feed gas. At a pressure of 5.77 MPa (57.7 bar abs.) and a temperature of 30° C., the feed gas contained the following acidic constituents: 11.92%(v/v) of $H_2S$, 5.86%(v/v) of $CO_2$, 37 $ppm_v$ of $CH_3SH$, 6.1 $ppm_v$ of $C_2H_5SH$ and 3.3 $ppm_v$ of $C_3H_7SH$. The absorber top of column temperature was 48° C.

The gas was treated with 180 m³/h of a scrubbing solution which had the following composition: 33.5% by weight of MDEA, 6.5% by weight of piperazine and 60.0% by weight of water. A virtually completely regenerated scrubbing liquor was used here as well. The residual contamination of the scrubbing liquor was less than 2 m³ of acid gases per 1000 kg of scrubbing liquor.

The clean gas contained 0.37% of $CO_2$, 3.0 $ppm_v$ of $H_2S$, 2.5 $ppm_v$ of $CH_3SH$, 1.0 $ppm_v$ of $C_2H_5SH$ and 1.0 $ppm_v$ of $C_3H_7SH$. 94.4% of the $CH_3SH$, 86.6% of the $C_2H_5SH$ and 75.6% of the $C_3H_7SH$ in the feed gas were removed.

What is claimed is:

1. A process for removing mercaptans from a fluid stream comprising mercaptans and at least one member selected from the group consisting of $CO_2$ and $H_2S$, which comprises
removing at least one mercaptan from the fluid stream by contacting the fluid stream in an absorption or extraction zone with a scrubbing liquor comprising:
at least one tertiary aliphatic alkanolamine of 3–12 carbon atoms, and
from 0.5 to 15% by weight of at least one activator selected from the group consisting of saturated 5-membered heterocycle, saturated 6-membered heterocycle, and a mixture thereof, wherein each heterocycle may optionally additionally contain a further heteroatom selected from the group consisting of nitrogen and oxygen;
wherein the amount of scrubbing liquor being supplied to the absorption or extraction zone is sufficient to remove at least $CO_2$ and $H_2S$ essentially completely from the fluid stream, to form a composition comprising a substantially decontaminated fluid stream and a loaded scrubbing liquor;

separating the substantially decontaminated fluid stream from the loaded scrubbing liquor;

and discharging the substantially decontaminated fluid stream and loaded scrubbing liquor from the absorption or extraction zone.

2. A process as claimed in claim 1, wherein the scrubbing liquor contains an excess of the aliphatic alkanolamine, based on the acidic gases to be removed.

3. A process as claimed in claim 1, wherein the scrubbing liquor contains not more than 5% by weight of a physical solvent for mercaptans.

4. A process as claimed in claim 1, wherein the tertiary alkanolamine used is methyldiethanolamine.

5. A process as claimed in claim 1, wherein the activator is a saturated 6-membered N-heterocycle which optionally contains further heteroatoms selected from the group consisting of oxygen and nitrogen.

6. A process as claimed in claim 1, wherein the activator is selected from the group consisting of monoethanolamine, monomethylethanolamine, diethanolamine, piperazine, methylpiperazine and morpholine.

7. The process claimed in claim 1, wherein the activator is piperazine or methylpiperazine.

8. A method process as claimed in claim 1, wherein the mixture scrubbing liquor contains from 10 to 70% by weight of methyldiethanolamine, from 0.5 to 15% by weight of piperazine, and water.

9. The process as claimed in claim 1, wherein the activator is a saturated 5-membered N-heterocycle which optionally contains further heteroatoms selected from the group consisting of oxygen and nitrogen.

10. A process as claimed in claim 1, wherein the amount of scrubbing liquor supplied to the absorption or extraction zone is sufficient to lower the $CO_2$ level to not more than 500 ppm and the $H_2S$ level to not more than 10 ppm.

11. A process as claimed in claim 1, wherein the amount of scrubbing liquor supplied to the absorption or extraction zone is sufficient to lower the $CO_2$ level to not more than 50 ppm and the $H_2S$ level to not more than 4 ppm.

12. The process claimed in claim 1, wherein the activator is piperazine.

13. The process claimed in claim 1, wherein the activator is methylpiperazine.

14. The process claimed in claim 1, wherein the activator is morpholine.

15. The process claimed in claim 1, wherein fluid stream is selected from the group consisting of hydrocarbon gas, natural gas, synthesis gas, heavy oil, heavy residues, refinery gas, liquid hydrocarbon and liquefied petroleum gas.

16. The process claimed in claim 1, wherein fluid stream is a gaseous or liquid hydrocarbon stream.

17. The process claimed in claim 1, wherein the scrubbing liquor does not contain cyclotetramethylene sulfone, aliphatic acid amide, NMP, N-alkylated pyrrolidones, methanol, alkyl ether polyethylene glycol or dialkyl ether of polyethylene glycol.

18. The process claimed in claim 1, wherein the loaded scrubbing liquor contains less than 1% by weight of hydrocarbons.

19. The process claimed in claim 1, wherein the loaded scrubbing liquor contains less than 0.3% by weight of hydrocarbons.

20. The process claimed in claim 1, wherein the loaded scrubbing liquor comprises from 3 to 8% by weight of piperazine.

\* \* \* \* \*